Patented Nov. 17, 1931

1,832,569

UNITED STATES PATENT OFFICE

JOLAND PIERRE PAUL MAYOR, OF LAUSANNE, SWITZERLAND, ASSIGNOR TO SOCIÉTÉ ALSACIENNE DE PRODUITS CHIMIQUES, OF PARIS, FRANCE, A FRENCH COMPANY

CATALYST AND PROCESS OF MAKING SAME

No Drawing. Application filed October 4, 1928, Serial No. 310,445, and in France December 31, 1927.

The present invention relates to an improved catalyst for effecting dehydrogenation and to a process of making same.

It is well known that the hydroxide of copper represented by the formula $CuO.H_2O$ can be used as a catalyst for de-hydrogenation purposes either in the pure state or mounted on a support, but this hydroxide is not capable of catalyzing all de-hydrogenations which have to be effected in the industry.

The object of the present invention is:—

1. A stable catalyst formed by a partially dehydrated hydroxide of copper which is more powerful as a de-hydrogenating catalyst than the copper hydroxide above mentioned.

2. A process for the manufacture of this stable catalyst.

The stable catalyst forming the object of the present invention is a substance corresponding to the formula $nCuO.H_2O$, in which $n$ is an integer greater than 1.

The process of manufacture of this catalyst consists in subjecting the copper hydroxide to progressive de-hydration in the mother liquor in which it is formed and in arresting and stabilizing this de-hydration at the stage $nCuO.H_2O$, by means of a stabilizing agent.

The invention also covers the use of alkaline and alkaline earth substances as stabilizing agents of this type.

Thus in order to carry out the invention an alkaline solution or a solution of an alkali or alkaline carbonate or bi-carbonate can be allowed to re-act at ordinary temperatures with a solution of copper salt.

The blue copper hydroxide $CuO.H_2O$ or copper carbonate is precipitated. This hydroxide or carbonate is left in suspension in the mother liquor and the temperature of the latter is slowly and moderately raised, whilst being kept below the boiling point. Under these conditions the blue copper hydroxide or copper carbonate is progressively decomposed, passing through various colours, and when the composition $nCuO.H_2O$ is attained the stabilizing agent is added to the solution. The whole is agitated for the necessary period, the temperature being maintained constant.

The homogeneous stable product which is in suspension in the solution is filtered off, washed, dried in the open air and pulverized. It consists of the hydrate of copper oxide $nCuO.H_2O$ and the stabilizer agent used.

Without wishing to put forward any definite theory as to the constitution of this product, it may nevertheless be stated that it does not appear to be a simple mixture of the partially de-hydrated copper hydroxide and the stabilizing agent added, but is on the contrary formed by an adsorption of one of these substances by the other.

As has already been stated in addition to the process detailed above and various methods of carrying the same into practice, the invention covers the new product resulting therefrom particularly:—

1. The product formed by the partially dehydrated stabilized hydrate of copper oxide.

2. The product formed by this partially dehydrated hydrate of copper oxide and a stabilizing agent for the de-hydration of hydrate of copper oxide.

In carrying out the above process:

(1) An alkaline earth base such as lime, baryta etc. an alkaline salt such as sodium sulphate etc. and sugar can be used as the stabilizing agent.

(2) (a) When the stabilizing agent used is insoluble, water, and (b) When the stabilizing agent used is soluble, a solution of this substance, is used for washing purposes.

Several methods of carrying out the above process will be described by way of example and without limiting the scope of the present invention in any manner.

Example 1

A 10% solution of copper sulphate containing 64 gms. of copper is added to a solution of 230 gms. of sodium carbonate in two litres of water. Copper carbonate is precipitated. The liquid is heated to 90° C. and the temperature is maintained constant until the hydrate $6CuO.H_2O$, which is identified by the dark brown colour of the mass, is produced. 306 gms. of baryta are then added. The liquid is stirred for several minutes, and the precipitate filtered, washed and dried in the vacuum.

Example 2

A suspension of the hydrate $6CuO.H_2O$ is prepared by the method described in Example 1, cooled and the copper oxide hydrate $6CuO.H_2O$ is rapidly filtered off, washed with a 5% solution of sodium sulphate until excess sodium carbonate is removed and finally the hydrate impregnated with this solution is dried in the vacuum.

Example 3

A 10% solution of copper chloride containing 64 gms. of copper is added to a milk containing 336 gms. of quick-lime, the excess lime acting as support or base. When the precipitation has finished the liquid is heated to boiling until the hydrate $4CuO.H_2O$ is produced which can be recognized by the clear brown colour of the liquid mass. The liquid is cooled, filtered and treated as in Example 1.

I declare that what I claim is:—

1. Process of preparing a catalyst comprising precipitating copper hydroxide or carbonate, progressively decomposing same by heating in presence of the mother liquor, treating the partially dehydrated copper hydroxide so obtained with a stabilizing agent in presence of the said mother liquor, and filtering, washing and drying in presence of the stabilizing agent the partially dehydrated and stabilized copper hydroxide so obtained.

2. Process of preparing a catalyst comprising precipitating copper hydroxide, partially dehydrating same by heating in presence of the mother liquor, stabilizing the partially dehydrated copper hydroxide so obtained by a basic compound in presence of the said mother liquor, and filtering, washing and drying in presence of the stabilizing agent the partially dehydrated and stabilized copper hydroxide so obtained.

3. Process of preparing a catalyst comprising precipitating copper hydroxide from a solution by using a basic compound, partially dehydrating same by heating in presence of the mother liquor, stabilizing the partially dehydrated copper hydroxide so obtained by an excess of the said basic compound in presence of the said mother liquor, and filtering, washing and drying in presence of the stabilizing agent the partially dehydrated and stabilized copper hydroxide so obtained.

4. Process of preparing a catalyst comprising precipitating copper hydroxide from a solution in presence of an inert substance as carrier, partially dehydrating same by heating in presence of the mother liquor, treating the partially dehydrated copper hydroxide so obtained with a stabilizing agent in presence of the mother liquor, and filtering, washing and drying in presence of the stabilizing agent the product consisting of the partially dehydrated and stabilized copper hydroxide so obtained on the said carrier.

5. Process of preparing a catalyst comprising precipitating copper hydroxide from a solution with an excess of a basic compound capable of acting as a stabilizer, partially dehydrating the copper hydroxide by heating in presence of the mother liquor, and filtering, washing and drying in presence of the stabilizing agent the partially dehydrated and stabilized copper hydroxide so obtained.

6. Process of preparing a catalyst comprising precipitating copper hydroxide from a solution with an excess of an alkaline earth base capable of acting as a stabilizer, partially dehydrating the copper hydroxide by heating in presence of the mother liquor, filtering, washing and drying in presence of the stabilizing agent the partially dehydrated and stabilized copper hydroxide so obtained.

7. Process of preparing a catalyst comprising precipitating copper hydroxide, partially dehydrating same by heating in presence of the mother liquor, treating the partially dehydrated copper hydroxide so obtained with a stabilizing agent in presence of the said mother liquor, and filtering, washing and drying in vacuo in presence of the stabilizing agent the partially dehydrated and stabilized copper hydroxide so obtained.

8. Process of preparing a catalyst comprising precipitating copper hydroxide from a solution, partially dehydrating same by heating in presence of the mother liquor, treating the partially dehydrated copper hydroxide so obtained by a stabilizing agent which is insoluble in presence in the said mother liquor, and filtering, washing with water and drying in presence of the said stabilizing agent the partially dehydrated and stabilized copper hydroxide so obtained.

9. Process of preparing a catalyst comprising precipitating copper hydroxide from a solution, partially dehydrating same by heating in presence of the mother liquor, treating the partially dehydrated copper hydroxide so obtained by a stabilizing agent which is insoluble in presence of the said mother liquor, and filtering, washing with water and drying in vacuo in presence of the said stabilizing agent the partially dehydrated and stabilized copper hydroxide so obtained.

10. Catalyst obtained by the process of claim 1 comprising a partially dehydrated hydroxide of copper and a stabilizing agent therefor.

11. Catalyst obtained by the process of claim 6 comprising a partially dehydrated copper hydroxide and an alkaline earth base as stabilizer therefor.

In witness whereof, I have hereunto signed my name this 15th day of September 1928.

JOLAND PIERRE PAUL MAYOR.